United States Patent

[11] 3,597,747

[72] Inventors Ted Winkler;
Paul E. Wells, both of Los Angeles, Calif.

[21] Appl. No. 526,577
[22] Filed Feb. 10, 1966
[45] Patented Aug. 3, 1971
[73] Assignee TRW Inc.
Redondo Beach, Calif.

[54] DIGITAL MEMORY SYSTEM WITH NDRO AND DRO PORTIONS
19 Claims, 5 Drawing Figs.

[52] U.S. Cl. .... 340/174, 340/172.5
[51] Int. Cl. .... G11c 5/02, G11c 11/08
[50] Field of Search .... 340/174 M, 172.5

[56] References Cited
UNITED STATES PATENTS

| | | | |
|---|---|---|---|
| 3,248,708 | 4/1966 | Haynes | 340/172.5 |
| 3,480,929 | 11/1969 | Bergman | 340/174 |
| 3,478,333 | 11/1969 | Faulkner | 340/174 |
| 3,289,184 | 11/1966 | Brown | 340/174 |
| 3,245,049 | 4/1966 | Sakalay | 340/172.5 |

*Primary Examiner*—James W. Moffitt
*Attorneys*—Daniel T. Anderson, J. A. Dinardo and Gerald Singer

ABSTRACT: A single hard core memory system is disclosed having a first portion capable of reading and writing information and a second portion having a capability of reading out information only. The memory described in a single memory system having common read means and common sense means which are common to both the destructive readout portion and the nondestructive readout portion.

INVENTORS
PAUL E. WELLS
TED WINKLER
BY Arthur Freilich
ATTORNEYS

INVENTORS
PAUL E. WELLS
TED WINKLER
BY Arthur Frederick
ATTORNEYS

INVENTORS
PAUL E. WELLS
TED WINKLER
BY Arthur Freilich
ATTORNEYS

DIGITAL MEMORY SYSTEM WITH NDRO AND DRO PORTIONS

This invention relates to digital memory systems of the type finding particular utility where weight, volume, and power considerations are significant, as in various space applications.

Many space vehicles carry some type of digital data processing equipment having at least some memory capacity. In many applications, a first portion of the total memory capacity requires only a read only capability during the space mission since this portion is intended to store data which should not be altered during the mission. Thus, data can be loaded into the read only memory portion prior to the mission while the vehicle is still on the ground. On the other hand, a second memory portion must usually be provided having both a read and write capability during the mission. The second memory portion is usually required for use as a scratch pad, for example.

Conventionally, two separate memories are provided, each having its own complement of selection apparatus, drivers, sense amplifiers, etc. Once such memory would, for example, be comprised of nondestructive readout elements such as multiaperture magnetic cores and the other memory portion of destructive readout elements such as single aperture magnetic cores. As a consequence of utilizing two separate memories in this manner, the weight and volume of the overall memory system per bit of storage capacity is usually undesirably high. Moreover, it would be exceedingly difficult to use the various memory circuits, e.g. sensing and driving circuits, in common with both memories where different types of memory elements are employed due to the inherently different characteristics of different memory elements.

Accordingly, it is an object of the present invention to provide a digital memory system comprised of first and second portions respectively having nondestructive readout (NDRO) and destructive readout (DRO) characteristics which portions provide a greater bit capacity per unit of weight and volume than functionally equivalent prior art memory systems.

In accordance with a significant feature of the present invention, a memory system is provided which is comprised of first and second portions respectively having NDRO and DRO characteristics, both portions operating in conjunction with common addressing, driving and sensing apparatus.

In accordance with a further feature of the invention, both portions of the memory utilize the same type of discrete magnetic storage elements interconnected with a minimum amount of wiring.

Briefly, in a preferred embodiment of the invention, a multiaperture magnetic core array, for example comprised of transfluxors, is provided. As is well known in the art, transfluxors are capable of defining a blocked state and first and second opposite unblocked states. When the transfluxor is in a blocked state, application thereto of selected first or second switching signals will have no effect on the transfluxor state. On the other hand, if the transfluxor is in a first unblocked state, the first switching signal will switch it to a second unblocked state and if the transfluxor is in the second unblocked state, application of the second switching signal will switch it to the first unblocked state.

In accordance with the preferred embodiment of the present invention, the blocked state is used to represent a first binary digit (e.g. "0") in the NDRO portion of the memory and either unblocked state is used to represent the other binary digit (i.e. "1"). On the other hand in the DRO memory portion, the two unblocked states are used respectively to represent the "0's" and "1's." By utilizing the memory in this manner, it is unnecessary to force any of the transfluxors into a blocked state after data has been initially loaded into the NDRO memory portion.

Thus, an embodiment of the invention is particularly well suited for space missions in that the drivers required to block the transfluxors can be retained on the ground and need not constitute part of the vehicle's payload. Moreover, by not carrying the blocked drivers along with the memory system, it becomes virtually impossible for any of the data stored in the NDRO memory portion to be destroyed during the mission.

It is a further feature of the invention to provide a memory organization including an array of discrete magnetic elements which can be selectively divided into NDRO and DRO portions, each portion containing a selected percentage of the entire array, without requiring any physical hardware modifications.

The novel features that are considered characteristic of this invention are set forth with particularity in the appended claims. The invention itself will best be understood from the following description when read in connection with the accompanying drawings, in which:

Figure 1:
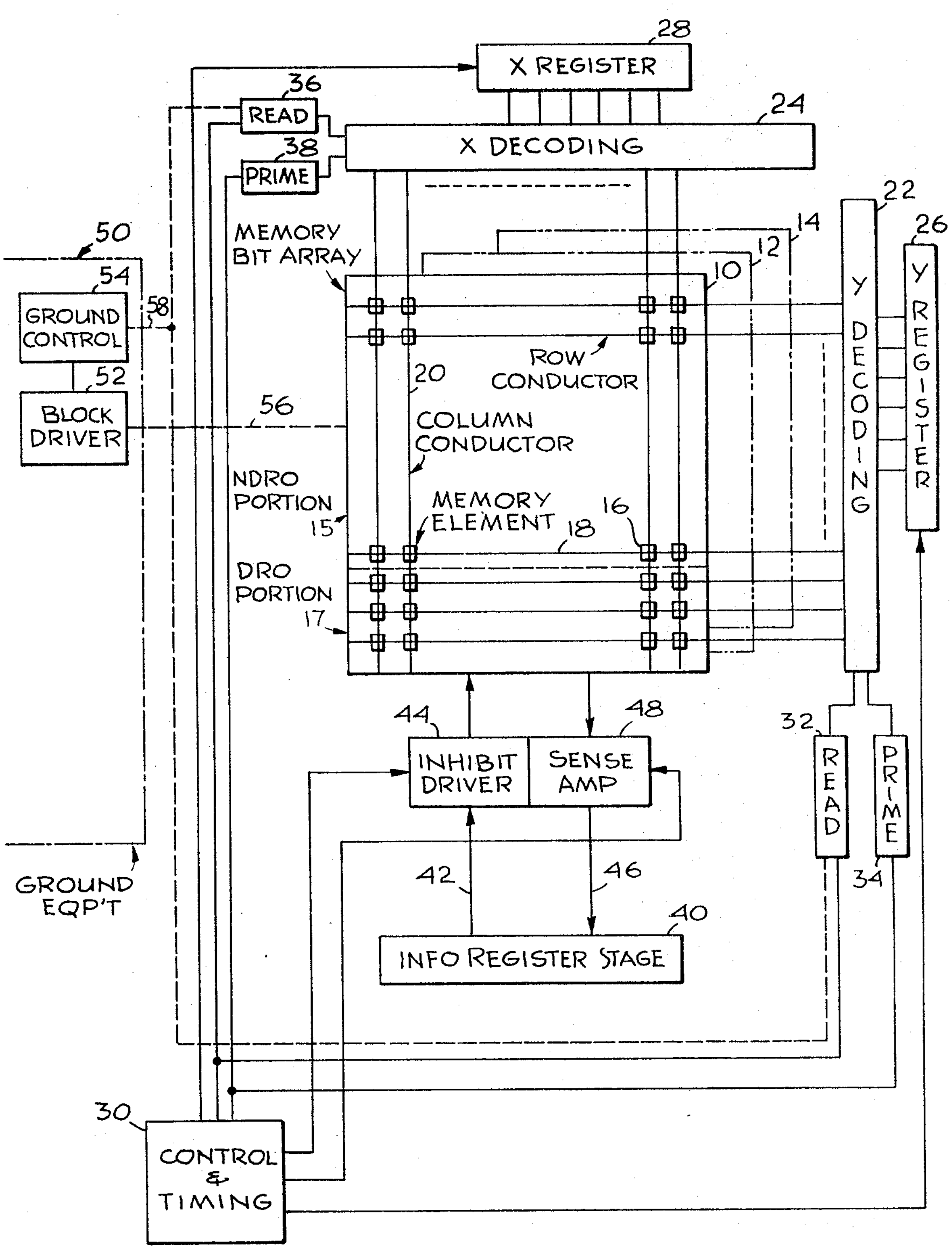
FIG. 1 is a block diagram of a memory system constructed in accordance with the present invention.

Attention is now called to FIG. 1 of the drawings which depicts a block diagram of a memory system constructed in accordance with the present invention. It will be recalled that an objective of the present invention is to provide a system having a nondestructive readout (NDRO) portion and a destructive readout (DRO) portion. A memory portion having NDRO capabilities is useful for permanently storing data which is intended to be accessed and used but not altered very often. That is, stored data can be accessed from locations in an NDRO memory portion without destroying the stored data. However, stored data can be accessed from locations in a DRO memory portion only by destroying the stored data and thus it is necessary to write the data back after it is read if the data is to be retained. A DRO memory portion is useful for scratch pad purposes, for example, where it is desired to store data representing intermediate computational results or data which is to be transferred to some output means.

Inasmuch as it is intended that a memory system constructed in accordance with the present invention find utility in space vehicles, it is very important that weight, volume and power requirements be minimized. An embodiment of the invention, as depicted by the block diagram of FIG. 1, fulfills these various objectives. The memory system of FIG. 1 includes a plurality of memory bit planes or arrays 10, 12, and 14. Each of the arrays is comprised of a rectangular matrix of discrete memory elements 16 arranged in intersecting rows and columns. Although any number of rows and columns can be employed in accordance with the invention, an exemplary bit array will be assumed to comprise of 64 rows and 64 columns thereby defining 4,096 points of intersection or memory element positions. As is conventional in the art, each memory element 16 in a single bit array, e.g., array 10, is employed to store a binary digit (bit) of corresponding significance in a different word. That is if the array 10 is comprised of 4,096 memory elements 16, than it is to be expected that the memory system is capable of storing 4,096 words, each word a bit length equal to the number of bit arrays employed. For example, three bit arrays are illustrated in FIG. 1 and thus the system is capable of storing 4,096 word each having a three-bit word length. Inasmuch as the bit arrays 10, 12, and 14 are all identically constructed, only array 10 will be considered in detail. Suffice to say at this point that each of the arrays is comprised of an NDRO portion 15 and a DRO portion 17. The difference between these two portions will be specifically discussed hereinafter.

All of the memory elements 16 in any single row in the bit array 10 are associated with a single row conductor 18. Thus if the array 10 is comprised of 64 rows of memory elements, then 64 different row conductors 18 must be provided. Similarly, each column of memory elements 16 is associated with a different column conductor 20. All of the row conductors 18 extend from a Y decoding circuit 22. All of the column conductors 20 extend from an X decoding circuit 24.

A six-bit Y register 26 is coupled to the Y decoding circuit 22. The Y register 26 is provided for storing a six-bit Y address code which is capable of defining any one of the 64 row conductors 18. Similarly, a six-bit X register 28 is connected to the X decoding circuit 24. The contents of the X register 28 is similarly capable of defining any one of the column conductors 20. Thus, six bit address codes stored in the X and Y registers, 28 and 26, can together select any one of the memory elements 16 in the array 10. This type of selection is known as coincident current selection inasmuch as coincidence of current on both a column and a row conductor are required to select a particular memory element for either reading or writing. Although not illustrated, the row and column conductors 18 and 20 are associated with all of the bit arrays 10, 12 and 14 so that selection of a particular memory element 16 actually involves the selection of a corresponding memory element in each of the bit arrays thus enabling a full word to be read or written at the same time.

Address codes are supplied to the X and Y registers 28 and 26 from a control and timing device 30. As pointed out, the address codes stored in the registers 28 and 26 respectively select one of the column and one of the row conductors through the decoding circuits 24 and 22. The decoding circuits 24 and 22 can be conventional circuits comprised of a plurality of gates, each gate controlling a different one of the conductors. The control and timing device 30 also controls a read signal circuit 32 and a prime signal circuit 34 coupled to the decoding circuit 22 and a read signal circuit 36 and a prime signal circuit 38 coupled to the decoding circuit 24. When it is desired to provide read signals to a memory element selected by the address codes in the X and Y registers, the read signal circuits 32 and 36 are enabled by the control and timing device 30. When it is desired to provide prime signals to a selected memory element 16, the prime signal circuits 34 and 38 are enabled by the control and timing device 30. The utility and characteristics of the read and prime signals will be discussed hereinafter.

A different information register stage, is coupled to each bit of the bit arrays, 10, 12 and 14. For purposes of clarity, FIG. 1 only illustrates information register stage 40 coupled to a bit array 10. The stage 40 can comprise a conventional flip-flop and is intended to store binary data to be written into a read from the array 10. An output line 42 of the stage 40 is coupled to an inhibit driver 44 which, as will be understood better hereinafter, is employed in order to write information into certain memory elements 16; that is memory elements in the DRO portion of the array 10. An input line 46 to the stage 40 extends from a sense amplifier 48 which is responsive to information read from any memory element 16 in either portion of array 10. Both the inhibit driver 44 and the sense amplifier 48 are controlled by signals provided by the control and timing device 30.

All of the elements in FIG. 1 thus far discussed form the portion of the memory system intended to be carried by a space vehicle, for example. In addition to these elements, other elements are provided which are intended to be used with the memory system thus far recited in order to initially load information into the system. However, in accordance with the present invention, these additional elements are intended to remain on the ground; that is, they do not form a portion of the memory system carried by the space vehicle. More particularly, ground equipment 50 is provided including a block signal driver circuit 52 and a ground control device 54. The block signal driver circuit is intended to be coupled via conductor 56 (shown in dotted line) to the array 10 for the purpose of initially loading information into the array 10. However the conductor 56 is physically separable from the array 10 and is intended to be disconnected therefrom after information has been initially loaded. The block signal driver circuit 52 is controlled by the ground control device 54 which in addition controls the amplitude of the select signals provided by circuits 32 and 36 by a physically separable conductor 58 (shown in dotted line).

Figure 2:
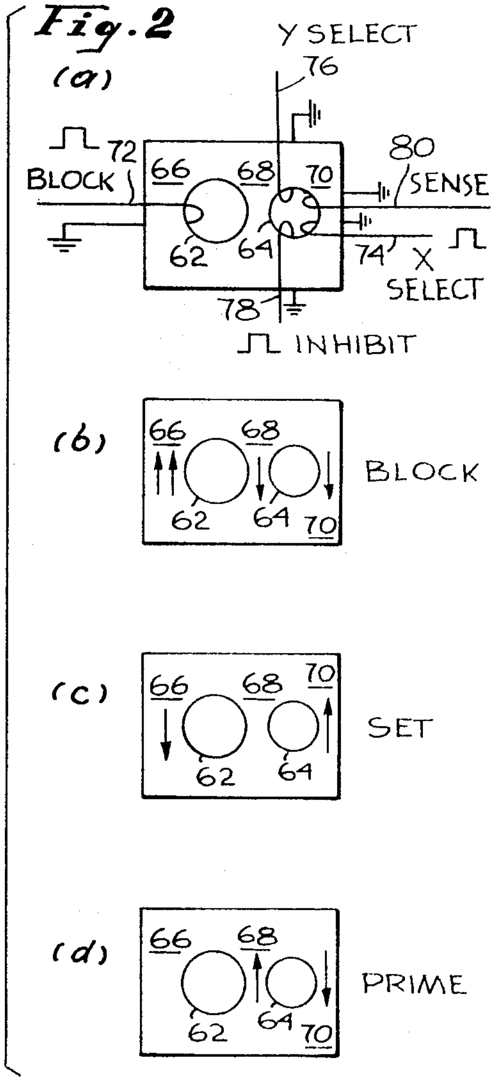
FIG. 2 is a schematic diagram illustrating both the manner in which an exemplary memory element, i.e. a transfluxor, can be wired in accordance with the present invention and the states capable of being defined by the memory element.

Prior to considering the detailed structure of the array 10 and the manner of operation of the system of FIG. 1, attention is called to FIG. 2 which illustrates a typical memory element 16 which can be very suitable employed in the system of FIG. 1.

More particularly, FIG. 2(*a*) schematically illustrates a transfluxor element 60 which has been extensively described in the literature. Typically, a transfluxor comprises a small block of magnetic material having a substantially square loop characteristic and generally defining a large aperture 62 and a small aperture 64. The magnetic material to one side of the large aperture 62 is usually referred to as a major flux leg and will be identified by the numeral 66. A first minor flux leg 68 is defined between the apertures 62 and 64 and a second minor flux leg 70 is defined on the outer edge of the minor small aperture 64. The cross-sectional area of the leg 66 is usually approximately equal to the sum of the cross-sectional areas of the legs 68 and 70. Prior to discussing the manner in which various windings thread the apertures 62 and 64 through the transfluxor, attention is called to FIGS. 2(*b*), (*c*), and (*d*) which, at least to a first order approximation, described various magnetic states to which the transfluxor element can be switched.

The transfluxor is shown in FIG. 2(*b*) in a blocked state in which it is saturated in a clockwise direction. More particularly, the flux saturating the leg 66 is split between the legs 68 and 70. Thus a closed magnetic path is defined around both of the apertures 62 and 64 rather than around the small aperture 64. FIG. 2(*c*) illustrates a first unblocked state of the transfluxor which will hereinafter be referred to as a set state. In this state, the flux is in a counterclockwise direction in legs 70 and 66. FIG. 2(*d*) illustrates a second unblocked transfluxor state, which will hereinafter be referred to as a prime state, in which the legs 68 and 70 are saturated in opposite directions from the first unblocked state of FIG. 2(*c*). That is the closed magnetic path around the small aperture 64 is in a clockwise direction.

In order to switch the transfluxor between the states illustrated in FIGS. 2(*b*), (*c*), and (*d*), various windings are threaded through the apertures 62 and 64 as shown in FIG. 2(*a*). More particularly, a block winding 72 is threaded through the large aperture 62. A positive current of sufficient amplitude through the block winding 72 will switch all of the flux in the transfluxor 60 in a clockwise direction thus switching the transfluxor to the blocked state of FIG. 2(*b*). An X selection winding 74 is threaded through the small aperture 64. Similarly a Y selection winding 76 is threaded through the small aperture 64. Also, an inhibit selection winding 78 and a sense winding 80 are threaded through the small aperture 64. Positive currents applied to the X and Y select windings tend to orient the flux in a clockwise direction around the small aperture 64. Thus, if the transfluxor is in the blocked state of FIG. 2(*b*), positive currents applied to the windings 74 and 76 will only tend to further saturate the transfluxor and thus will have no significant effect on its state. A positive current through the inhibit winding 78 also tends to orient the flux in a clockwise direction around the aperture 64. The sense winding 80 is of course provided for sensing when the transfluxor switches from one state to another. For example, when the transfluxor switches from the state depicted in FIG. 2(*c*) to the state depicted in FIG. 2(*d*), a pulse will be induced in the sense winding 80.

Figure 3:
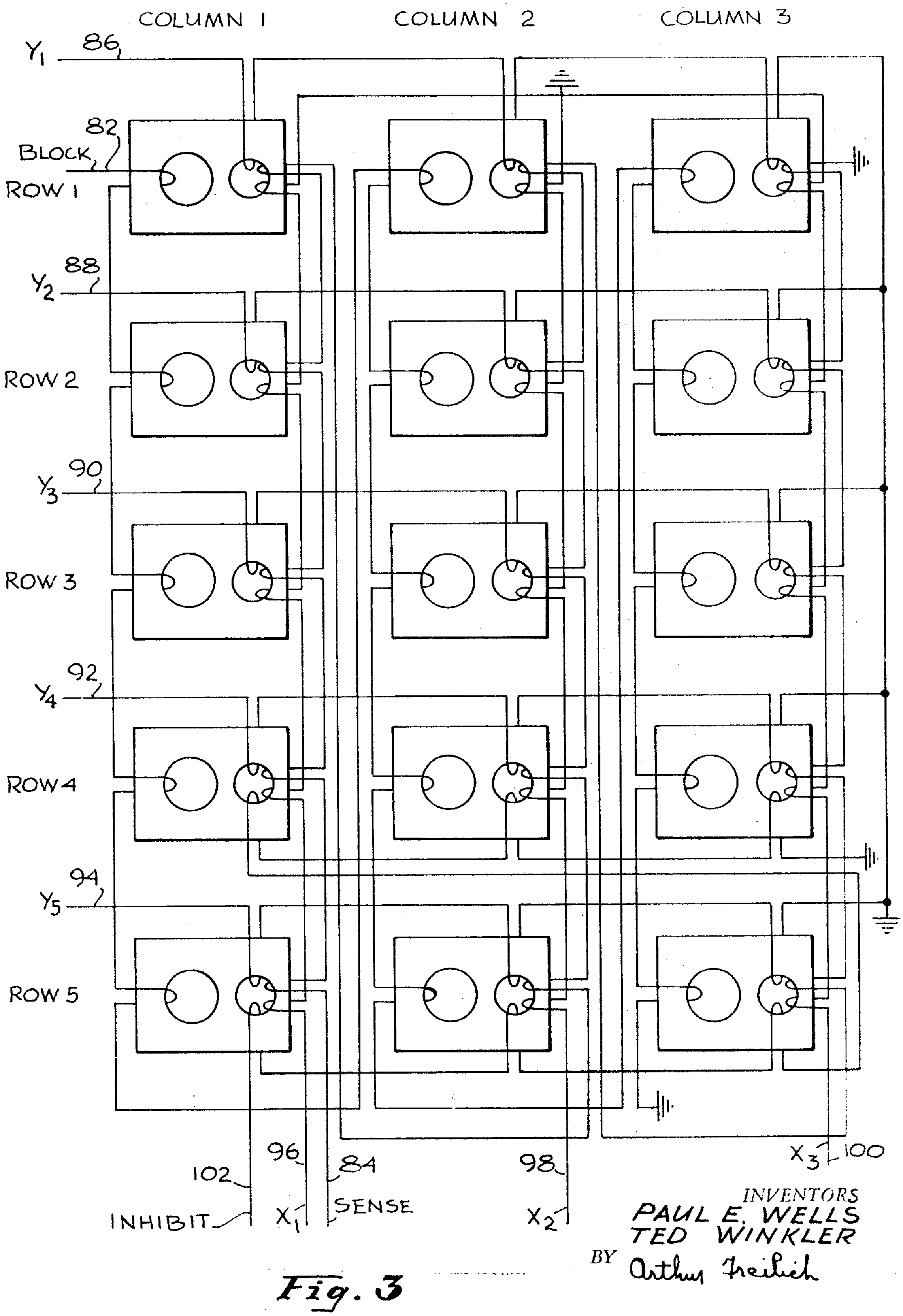
FIG. 3 is a schematic diagram illustrating a transfluxor array wired in accordance with the teachings of the present invention.

Prior to considering the sequence of signals applied to the windings 72, 74, 76, and 78, attention is called to FIG. 3 which illustrates how a plurality of transfluxors 60 can be connected together in a matrix arrangement to form an array, like array 10 of FIG. 1. Although FIG. 3 illustrates a transfluxor matrix comprised of three rows and five columns, it should be understood that the features thereof are applicable to a matrix of any size.

A block winding 82 is serially threaded through the large aperture of all of the transfluxors in the array of FIG. 3. Similarly, the sense winding 84 is serially threaded through the small aperture of all of the transfluxors in the array of FIG. 3.

The small aperture of all of the transfluxors in row 1 of the array of FIG. 3 are threaded by a first ($Y_1$) select winding 86. Similarly, the small apertures of the transfluxors of rows 2, 3, 4, and 5 are respectively threaded by Y select windings 88, 90, 92, and 94. The small apertures of the transfluxors in columns 1, 2 and 3 of the array of FIG. 3 are respectively threaded by X select windings 96, 98 and 100.

A single inhibit winding 102 is serially threaded through the small aperture of all of those transfluxors in the destructive readout portion of the array of FIG. 3. That is, as will be seen hereinafter, in order to write information into the transfluxors without utilizing the ground equipment 50 of FIG. 1, it is necessary to utilize the inhibit winding 102. Inasmuch as once the ground equipment has been separated from the portions of the system to be carried by the space vehicle, it is only necessary to write in the DRO memory portion, the inhibit winding 102 therefore threads only those transfluxors in the DRO position. As a matter of fact, this structural distinction determines whether each transfluxor forms part of the NDRO or DRO portion of the array. For exemplary purposes only, it will be assumed that the DRO portion of the memory array of FIG. 3 is comprised only of the transfluxors of rows 4 and 5. Thus as should be apparent in FIG. 3, the inhibit winding 102 serially threaded the small aperture of all of the transfluxors of rows 4 and 5.

Figure 4:
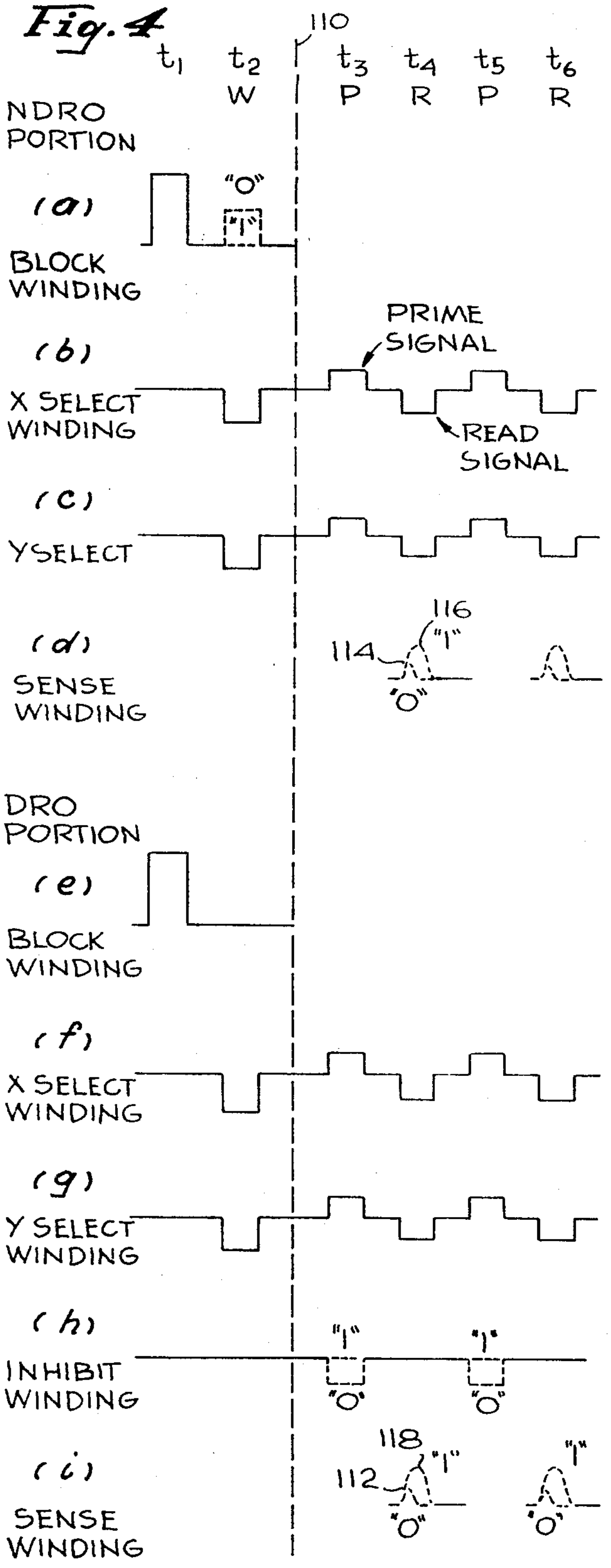
FIG. 4 is comprised of a series of waveforms tending to illustrate the operation of the array of FIG. 3.

In order to understand the operation of the system of FIG. 1 employing a transfluxor array wired as shown in FIG. 3, attention is called to the waveform charts set forth in FIG. 4. Initially, it is mentioned that the waveform charts illustrate the sequence of pulses applied to the various windings threading the transfluxor array of FIG. 3 for initially loading information into the array utilizing the ground equipment 50 of FIG. 1 and for subsequently operating the array to read information from the NDRO portion and to read and write information in the DRO portion after the ground equipment 50 has been separated from the array. Lines (*a*)—(*d*) of FIG. 4 pertain primarily to the NDRO portion of the array and lines (*e*)—(*i*) to the DRO portion. It will become apparent that essentially the same sequence of pulses is applied to the various windings in both the NDRO and DRO portions of the array.

Initially considering the NDRO portion, during time portion $t_1$ a positive pulse is applied to the block winding 82. This pulse has sufficient amplitude to switch all of the transfluxors in both the NDRO and DRO portions of the array to a blocked state as represented by the configuration of FIG. 2(*b*). Subsequently during time period $t_2$, negative pulses are applied to the X and Y select windings, selecting the transfluxors in sequence. The amplitude of the currents in each of the X and Y select windings during time period $t_2$ is equal approximately to one-half the amplitude of the block current applied during period $t_1$. The coincident effect of the negative pulses on the X and Y select windings is to switch the appropriate transfluxor to the set state as shown in FIG. 2(*c*). However, the block winding 82 is concurrently used during time period $t_2$ to either permit the selected transfluxor to be switched to the set state or prevent it from being switched out of the blocked state. That is if a "0" bit is to be stored, then a positive pulse is applied to the block winding 82 during time period $t_2$ which has the effect of compensating for the effect of the negative pulses applied to the X and Y select windings. Thus where "0" bits are to be stored, the transfluxor is forced to remain in a blocked state as shown in FIG. 2(*b*). However, if a "1" is to be stored, than the negative pulses applied to the X and Y selected windings are permitted to switch the transfluxor to the set state of FIG. 2(*c*). It should be appreciated that the operation, that is of blocking all of the transfluxors, performed in time period $t_1$ is performed in a single time interval whereas the operations represented in FIG. 4 as being performed in time period $t_2$ requires one time interval for each of the transfluxors in the array.

It is to be understood that signal configurations other than those shown in FIG. 4 can be used to achieve the same results if desired. For example only, unblocking, (as in time $t_2$) can be performed if desired by the simultaneous application of negative pulses to the block X AND Y select windings. Of course the amplitudes of the signals applied to the select windings would then be less than is shown in FIG. 4, In order to retain a core in its blocked state, the negative pulse on the block winding would merely be deleted.

With respect to the DRO position of the memory, line (*e*) of FIG. 4 shows all of the transfluxors thereof as being forced to the blocked state by the positive current pulse on block winding 82 during time period $t_1$. Of course the transfluxors in the DRO position of the memory are switched to the blocked state simultaneously with the transfluxors of the NDRO position. During the time period $t_2$ the transfluxors in the DRO portion of the memory are sequentially switched to the set state of FIG. 2(*c*) by the application of negative pulses to the X AND Y select lines. Inasmuch as it is desired that all of the transfluxors in the DRO portion of the memory be switched to the set state during time period $t_2$, no current is applied to the block winding 82 during the portions of this period in which the DRO portion transfluxors are being selected.

After the time period $t_2$, that is after all of the transfluxors in the NDRO position of the memory have been switched either to the blocked state or the set state and all of the transfluxors in the DRO portion of the memory have been switched to either one of the unblocked states, then the ground equipment 50 can be physically separated from the memory arrays. This separation is represented by the dotted line 110 is FIG. 4.

After the ground equipment 50 has been separated from the transfluxor array, during time period $t_3$ positive pulses are applied to the X and Y select lines, as represented by lines (*b*) and (*c*) OF FIG. 4, to sequentially switch all of the transfluxors in the NDRO portion of the memory in the set state [FIG. 2(*c*)] to the prime state [FIG. 2(*d*)]. The amplitude of the pulse applied to the X AND Y select lines need only be half the amplitude of the negative pulses previously applied during time period $t_2$. This is because during time period $t_2$, the pulses on the X and Y select lines were employed to switch flux around both the large and small apertures of the transfluxor. Typically, for this purpose, a total of 1,300 milliampere-turns can be required. That is the pulse on the block winding during time period $t_1$ would have to be 1,300 milliampere-turns and the negative pulses on the X and Y select windings applied during time period $t_2$ would each have to be 600 milliampere-turns. However, during time period $t_3$, it is only necessary that the positive pulses on the X and Y select lines switch flux around the small aperture 64 to switch a transfluxor from the set to the prime state. Accordingly, for this purpose a total of only about 600 milliampere-turns may be required (i.e. 300 milliampere-turns on each select winding).

During this time period $t_3$, information is written into the transfluxors of the DRO portion of the memory by also employing positive pulses on the X and Y select lines. In addition to this however, a negative pulse is applied to the inhibit lines [line (*h*), FIG. 4] if a "0" is to be stored. Accordingly, if a "0" is to be stored in a DRO portion transfluxor, then that transfluxor is forced to remain in a set state inasmuch as the negative pulse on the inhibit line will prevent the positive pulses on the X and Y select lines from switching the transfluxor from the set to the prime state. On the other hand, if a "1" is to be stored in the DRO portion transfluxor, then the positive pulses on the X and Y select lines are permitted to switch the transfluxor to the prime state. In summary then, after time period $t_3$, "0's" in the NDRO portion will be represented by the blocked state, "0's" in the DRO portion will be represented by the set state and "1's" in both the NDRO and DRO portions will be represented by the prime state.

During time period $t_4$, information can be read from the array. In order to do this, negative pulses are applied to the X and Y select lines. Negative pulses applied to the X and Y select lines of course tend to switch the flux around the small aperture 64 in a counterclockwise direction. Thus transfluxors in the DRO memory portion already in the set or "0" state will provide virtually no output signal on the sense line as represented by the insignificant excursion 112 shown in line (*i*) in FIG. 4. Similarly, a transfluxor in the NDRO portion of the memory in a blocked state as shown in FIG. 2(*b*) will likewise provide a very insignificant excursion 114 as shown in line (*d*) of FIG. 4 since the negative pulses on the select lines will have insufficient amplitude to unblock a blocked transfluxor. However, transfluxors in either the NDRO or DRO portions of the array storing a "1" will switch from the prime state of FIG. 2(*d*) to the set state of FIG. 2(*c*) in response to the negative pulses applied to the X and Y select windings in time period $t_4$ and consequently will give rise to substantial excursions 116 and 118 shown in lines (*d*) and (*i*) of FIG. 4. During a subsequent time period $t_5$, positive pulses can be applied to the X and Y select windings in sequence to ready the transfluxors in the NDRO portion of the memory for subsequent reading and to write information into the transfluxors of the DRO portion. Again, information is written into the DRO portion transfluxors by controlling the inhibit winding 102 to either permit the transfluxor to switch from the set to the prime state or to prevent such switching. During time period $t_6$, the transfluxors can again be read.

From the foregoing, it should be appreciated that the transfluxors of the NDRO portion of the memory can be read repeatedly without destroying the information previously stored therein when the memory system was initially coupled to the ground equipment. Moreover, since the amplitude of the pulses applied to the X and Y select windings subsequent to the separation of the ground equipment from the transfluxor array is insufficient to switch the transfluxors into or out of a blocked state, the information stored in the NDRO portion of the memory cannot be destroyed. The NDRO portion of the memory therefore acts as a read only memory after the ground equipment 50 has been separated from the transfluxor arrays. The DRO portion of the memory on the other hand can be used for reading and writing inasmuch as its two binary states are defined by the set and prime states of FIGS. 2(*c*) and 2(*d*) rather than by the blocked state of FIG. 2(*b*).

It should be appreciated that the only difference between processing information in the NDRO and DRO portions of the memory involves controlling the inhibit line 102 in accordance with the information to be written into the DRO portion of the memory. The inhibit line is of course controlled by the inhibit driver 44 of FIG. 1 depending upon the state of the information register stage 40. The inhibit driver is enabled by the control and timing device 30 only when information is to be written into a DRO portion transfluxor. Thus, it is necessary that the control and timing device 30 provide an enabling pulse to the inhibit driver 44 when information is to be written into the DRO portion. Whether a transfluxor in the DRO or NDRO portion in memory is being selected of course depends upon the address code stored in the Y register. That is, for the example assumed, a DRO portion transfluxor is selected when the Y register address code defines row 4 or 5. Thus, the inhibit driver 44 can be enabled by the control and timing device whenever the address code in the Y register defines either row 4 or 5. In order to recognize when the Y register defines either row 4 or 5 of the matrix, a pair of decoding gates can be provided within the control and timing means.

Figure 5:
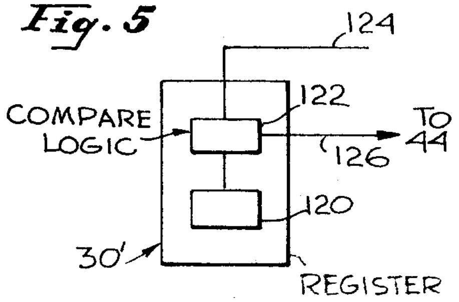
FIG. 5 is a block diagram of a portion of an alternative embodiment of the invention in which arbitrarily selected portions of the memory array can be given either NDRO or DRO characteristics without requiring any physical hardware modifications.

In order to extend the capabilities of the system of FIG. 1 so as to permit the entire array to be used as either an NDRO or DRO memory or to permit any selected portion thereof to be used as either type of memory, the inhibit winding 102 of FIG. 3 can be threaded through every one of the transfluxors in the array. However, the inhibit driver 44 of FIG. 1 should then be enabled to provide information to the inhibit winding only when a transfluxor was being selected in the selectively defined DRO portion of the memory. In order to permit a DRO memory portion to be selectively defined, the control and timing means 30′ of FIG. 5 can include a register 120 in which a matrix row address can be stored. The output of the register 120 can be coupled to a compare logic circuit 122 which also receives an input via conductor 124 from the Y register 26. Whenever the code stored in the Y register exceeds that stored in the register 120, the compare logic circuit 122 will provide an enabling signal via conductor 126 to the inhibit driver 44. Thus if the entire memory array is to have a DRO capability, then the number zero can be entered into register 120 so that for any Y address code, the compare logic will provide an enabling signal on conductor 126. On the other hand, if the entire memory array is to have a NDRO capability, then a maximum number can be stored in the register 120 so that no Y address code can exceed it. In this event, the compare logic circuit 122 will never provide an enabling signal to inhibit driver 44. If desired, a different criteria, for example in terms of column or a particular transfluxor, can be used to define the limits of the DRO memory portion rather than a row criteria as has been described.

From the foregoing, it should be appreciated that a memory system has been provided herein in which a single matrix of identical memory elements operating with a single addressing structure defines first and second portions respectively having NDRO and DRO capabilities. As a consequence of such a construction, these capabilities are provided in a system having minimum volume and weight, therefore making it extremely suitable for use on space vehicles. Moreover, inasmuch as the ground equipment required to initially load information into the array is not required thereafter in accordance with the invention, only a minimum amount of hardware actually forms part of the vehicle payload.

It is recognized that the aforedescribed invention can be practiced through the use of various implementations, not specifically shown herein, without departing from the basic teachings of the invention, and thus it is intended that any such modifications falling within the spirit of the invention be encompassed by the appended claims.

What I claim is:

1. A digital memory system comprising:

a plurality of identical memory elements;

a nondestructive readout memory portion comprised of a first group of said memory elements;

a destructive readout memory portion comprised of a second group of said memory elements;

a common read means for applying a read signal to a selected one of said memory elements; and a common sense means responsive to switching in any one of said memory elements.

2. The memory system of claim 1 including means for electrically changing the ratio of the number of memory elements in said nondestructive readout portion to the number of memory elements in said destructive readout portions.

3. The memory system of claim 1 wherein each of said memory elements comprises a multiaperture magnetic core.

4. The memory system of claim 1 wherein each of said memory elements comprises a multiaperture magnetic core capable of defining a blocked state and first and second unblocked states; and wherein said nondestructive readout memory portion includes some elements defining said blocked state and said destructive readout memory portion includes elements only defining said first and second unblocked states wherein said read signal is effective only to switch the selected element from said second to said first unblocked state.

5. The memory system of claim 4 including block means for switching said memory elements to said blocked state, said block means including a block conductor coupled to each of said memory elements and a drive means adapted to be selectively connected to or physically separated from said block conductor.

6. The memory system of claim 4 including a common prime means for applying a prime signal to a selected one of said memory elements effective only to switch the selected element from said first to said second unblocked state.

7. The memory system of claim 6 including a binary drive means capable of defining first and second states; and means for inhibiting said prime signal from switching any memory element is said destructive readout portion in the event said drive means defines said second state.

8. The memory system of claim 7 wherein said memory elements are arranged in a rectangular matrix comprised of intersecting rows and columns, the elements of each row being coupled to a common row conductor and the elements of each column being coupled to a common column conductor; and wherein said read and prime signals are comprised of signals concurrently applied to a row conductor and a column conductor and effective at the element at the intersection thereof.

9. The memory system of claim 8 wherein said means for inhibiting said prime signals includes an inhibit conductor coupled to all of said elements in said destructive readout portion; and wherein said sense means includes a sense conductor coupled to all of said memory elements.

10. The memory system of claim 9 wherein each of said multiaperture cores comprises a transfluxor having a large and small aperture; and wherein said row and column conductors and said inhibit and sense conductors thread said small apertures.

11. The memory system of claim 10 including block means for switching said memory elements to said blocked state, said block means including a block conductor coupled to each of said memory elements and a drive means adapted to be selectively connected to or physically separated from said block conductor, said block conductor being threaded through said large apertures.

12. A digital memory system comprising:

a plurality of identical memory elements each capable of defining either a blocked state or a first or second unblocked state;

said plurality of memory elements being comprised of first and second ground of elements;

means applying a read signal to a selected memory element effective only to switch said element from said second to said first unblocked state;

binary sense means coupled to each of said plurality of memory elements and responsive to an element switching from said second to said first unblocked state for indicating a first state;

binary drive means capable of defining first and second states;

means applying a prime signal to a selected memory element effective only to switch said element from said first to said second unblocked state; and means inhibiting said prime signal from switching said selected memory element in the event said element is in said second group and said drive means defines said second state.

13. The memory system of claim 12 including means for electrically changing the ratio of the number of memory elements in said first group to the number of memory elements in said second group.

14. The memory system of claim 12 wherein said first group of memory elements includes at least some elements defining said blocked state and said second group includes elements defining only either said first or second unblocked states.

15. The memory system of claim 12 wherein each of said memory elements comprises a multiaperture magnetic core.

16. The memory system of claim 12 wherein said memory elements are arranged in a rectangular matrix comprised of intersecting rows and columns, the elements of each row being coupled to a common row conductor and the elements of each column being coupled to a common column conductor; and wherein said read and prime signals are each comprised of signals concurrently applied to a row conductor and a column conductor and effective at the element at the intersection thereof.

17. The memory system of claim 12 wherein said means for inhibiting said prime signals includes an inhibit conductor coupled to all of said elements in said second group; and wherein said sense means includes a sense conductor coupled to all of said memory elements.

18. A method of operating a digital memory system comprised of a plurality of memory elements each capable of defining a blocked state and first or second unblocked states to provide nondestructive and destructive readout portions, said method including the steps of;

physically coupling a block signal source to all of said memory elements;

causing said block signal source to provide a signal to all of said elements tending to switch them to said blocked state;

inhibiting all of said elements in said destructive readout portion and selected elements in said nondestructive readout portion from switching to said blocked state to thereby enter data into said nondestructive readout portion;

physically decoupling said block signal source from said memory elements;

applying a prime signal to selected ones of said memory elements tending to switch said selected elements in an unblocked state to said second unblocked state;

selectively inhibiting said prime signal from switching elements of said destructive readout portion to which it is applied to thereby enter data into said destructive readout portion; and applying a read signal to selected ones of said memory elements tending to switch said selected elements to said first unblocked state.

19. The method of claim 18 including the additional step of sensing to determine whether or not an element switches in response to said read signal.